(12) United States Patent
Poyhonen et al.

(10) Patent No.: US 8,958,421 B2
(45) Date of Patent: Feb. 17, 2015

(54) COMMUNICATIONS IN RELAY NETWORKS

(75) Inventors: Petteri Poyhonen, Helsinki (FI); Ove Strandberg, Lappbole (FI)

(73) Assignee: Nokia Corporation, Espoo (FI)

( * ) Notice: Subject to any disclaimer, the term of this patent is extended or adjusted under 35 U.S.C. 154(b) by 1827 days.

(21) Appl. No.: 11/486,462

(22) Filed: Jul. 14, 2006

(65) Prior Publication Data

US 2007/0253444 A1    Nov. 1, 2007

(30) Foreign Application Priority Data

Apr. 27, 2006 (GB) .................................. 0608385.1

(51) Int. Cl.
| | | |
|---|---|---|
| H04L 12/28 | (2006.01) | |
| H04W 4/00 | (2009.01) | |
| H04B 7/185 | (2006.01) | |
| H04M 15/00 | (2006.01) | |
| G06Q 20/00 | (2012.01) | |
| H04W 28/06 | (2009.01) | |
| H04L 12/14 | (2006.01) | |
| H04L 12/66 | (2006.01) | |
| H04L 12/701 | (2013.01) | |
| H04W 4/24 | (2009.01) | |
| H04W 84/22 | (2009.01) | |

(52) U.S. Cl.
CPC ............... *H04W 28/06* (2013.01); *H04L 12/14* (2013.01); *H04L 12/66* (2013.01); *H04L 45/00* (2013.01); *H04M 15/00* (2013.01); *H04M 15/48* (2013.01); *H04W 4/24* (2013.01); *H04M 2215/0156* (2013.01); *H04W 84/22* (2013.01)

USPC ........... 370/389; 370/316; 370/328; 370/338; 379/114; 379/124; 379/126; 705/77

(58) Field of Classification Search
USPC .......... 370/316, 328, 338, 492, 501; 379/114, 379/124, 126; 705/77
See application file for complete search history.

(56) References Cited

U.S. PATENT DOCUMENTS

| | | | |
|---|---|---|---|
| 6,208,977 B1 * | 3/2001 | Hernandez et al. ............ | 705/34 |
| 6,338,046 B1 * | 1/2002 | Saari et al. ...................... | 705/34 |
| 6,999,479 B1 | 2/2006 | Jha | |
| 2003/0179742 A1 * | 9/2003 | Ogier et al. ................... | 370/351 |
| 2004/0001433 A1 * | 1/2004 | Gram et al. ................... | 370/229 |
| 2004/0037260 A1 * | 2/2004 | Kakemizu et al. ............ | 370/338 |
| 2004/0190476 A1 * | 9/2004 | Bansal et al. ................. | 370/338 |

(Continued)

FOREIGN PATENT DOCUMENTS

| | | |
|---|---|---|
| EP | 1 244 250 | 9/2002 |
| EP | 1 244 250 A | 9/2002 |

(Continued)

OTHER PUBLICATIONS $3^{rd}$ Generation Partnership Project TS 22.259 V1.0.0 (Jun. 2005).

(Continued)

*Primary Examiner* — Faruk Hamza
*Assistant Examiner* — Thinh Tran
(74) *Attorney, Agent, or Firm* — Harrington & Smith (57) ABSTRACT

A system and method for transmitting data in a communication system. First encapsulated data is received at a first node, and second encapsulated data associated with the first encapsulated data is generated at the first node. The first encapsulated data and the second encapsulated data are transmitted independently to one or more further nodes.

13 Claims, 5 Drawing Sheets

(56) References Cited

U.S. PATENT DOCUMENTS

| | | | |
|---|---|---|---|
| 2005/0108156 A1* | 5/2005 | Sumino et al. ............... | 705/40 |
| 2005/0201357 A1 | 9/2005 | Poyhonen | |
| 2006/0285534 A1* | 12/2006 | Bryson et al. ............... | 370/352 |
| 2007/0014292 A1* | 1/2007 | Obata ............... | 370/392 |
| 2007/0070959 A1* | 3/2007 | Almeroth et al. ............ | 370/338 |

FOREIGN PATENT DOCUMENTS

| | | |
|---|---|---|
| WO | WO-2004/051939 | 6/2004 |
| WO | WO 2004/066582 | 8/2004 |
| WO | WO 2004/098129 | 11/2004 |
| WO | WO-2004/103006 | 11/2004 |
| WO | WO 2004/103006 A | 11/2004 |
| WO | WO-2007/125404 A2 | 11/2007 |

OTHER PUBLICATIONS

Flinck et al., Issues of advanced mobility management in ambient networks. Wireless World Research Forum (WWRF), p. 1-7.

Niebert et al., Ambient networks—A new concept for mobile networking. Wireless World Research Forum (WWRF), p. 1-8.

Niebert et al., Ambient networks: An architecture for communication networks beyond 3G. IEEE Wireless Communications, Apr. 2004, p. 14-22.

Abrahamsson and Gunnar, Traffic engineering in ambient networks: Challenges and approaches. Swedish Institute of Computer Science, Kista, Sweden, p. 1-5.

Ahlgren et al., Ambient networks: Bridging heterogeneous network domains. A product of the Ambient Networks project supported in part by the European Commission under its Sixth Framework Programme, p. 1-5, Mar. 30, 2005.

Sixth Framework Programme, Priority IST-2002-2.3.1.4, Mobile and Wireless Systems beyond 3G Project 507134 WWI Ambient Networks, "Connecting Ambient Networks—Requirements and Concepts." D3.1, Version 1.0, Information Society Technologies, Jun. 28, 2004, p. 1-51.

Koo and Rajkotia, Configuration Scenario for multi-hop relay network. IEEE 802.16 Session #41, New Delhi, India, Jan. 2006.

Partial International Search Report for PCT Application No. PCT/IB2007/001119 dated Mar. 31, 2009.

Digital Cellular Telecommunications (Phase 2+); Universal Mobile Telecommunications System (UMTS); IP Multimedia Subsystem (IMS); Stage 2 (3GPP TS 23.228 version 7.3.0 Release 7), Mar. 1, 2006.

Universal Mobile Telecommunications System (UMTS); Telecommunication management; Charging management; Packet Switched (PS) domain charging (3GPP TS 32.251 version 6.6.0 Release 6); ETSI TS 132 251, Mar. 1, 2006.

International Search Report for PCT Application No. PCT/IB2007/001119 dated Jul. 14, 2009.

Girao, J., et al. "Implementing Charging in Mobile Ad Hoc Networks." Revista Do Detua, vol. 4, No. 2, Mar. 31, 2004.

\* cited by examiner

COMMUNICATIONS IN RELAY NETWORKS

CROSS-REFERENCE TO RELATED PATENT APPLICATIONS

The present application claims priority to Great Britain Priority Application GB 0608385.1, filed Apr. 27, 2006 including the specification, drawings, claims and abstract, all of which is incorporated herein by reference in its entirety.

FIELD OF THE INVENTION

The present invention relates to the field of communication systems, and in particular to methods and systems suitable for the transmission of encapsulated data in relay networks.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A communication system is a facility that enables communication between two or more entities such as user terminal equipment and/or networks entities and other nodes associated with the communication system. The communication may comprise, for example, communication of voice, electronic mail (email), text messages, data, multimedia and so on. The communication system can be used for providing the users thereof with various types of services.

The communication may be provided via fixed line and/or wireless communication interfaces. A feature of the wireless communication systems is that they provide mobility for the users thereof. Examples of communication systems providing wireless communication include cellular or mobile communications systems such as the public land mobile network (PLMN) and wireless data networks such the Wireless Local Area Network (WLAN). Examples of the fixed line systems include the public switched telephone network (PSTN) and various fixed line data networks.

There is an increasing demand for mobile communications services, and in particular increasing use of a diversity of mobile communication devices such as laptop computers, personal digital assistant (PDA) equipment such as palm tops and intelligent telephones. In addition to the wide area cellular networks mentioned above which may provide network access for such devices, new, more localized access networks have emerged in recent years. These include, for example, WLAN hotspots which may provide higher speed network access than is available from a cellular network, but only within a geographically restricted area.

Some cellular network operators may in certain cases enable their subscribers to roam into WLAN access networks. This is part of a more general trend where services are provided over a range of different access networks. With this trend comes the additional complexity derived from the need to offer services over radically different bearer types.

In addition to these cellular and WLAN networks which may be offered for public access, there has been a growth in private networks associated with individuals or corporate entities. These private networks may include personal area networks (PAN), comprising a plurality of devices under the control of a single user. Typically the private network contains a user equipment which can connect to an access network, such as mobile telephone equipped with wireless access to a PLMN. The additional devices in the PAN may communicate with the user equipment via wired or wireless connections, and may include, for example, a laptop, PDA, camera etc. Some of these devices may additionally be capable of independently accessing the same, or a different access network (for instance a laptop may alternatively access the internet via DSL). Wireless connections in a PAN may be enabled in a PAN using short range wireless communication systems such as Bluetooth.

In addition to personal area networks associated with a particular individual, localized private networks may be provided in a particular building, such as an office, shopping centre or home, for use by individuals or devices within that locality. Alternatively a private network may be installed in a particular vehicle, to provide high-speed access and to insulate users from problems associated with high physical mobility. The number of such private networks is growing continuously, but they vary in the degree to which they permit access to third parties. For instance, a PAN typically restricts access to a particular user. A private network installed in an office may permit access only to employees or devices associated with the corporate entity to which the office belongs. Likewise, a private network installed in a vehicle may be only for the use of the vehicle owner.

The growth of localized public and private networks could therefore provide new capabilities in terms of enhanced mobility and connectivity for users. However, for its full potential to be realized, the problems associated with integrating heterogeneous control technologies employed by the different networks need to be overcome. Furthermore, the availability of network access could be rapidly enhanced by expanding the accessibility of private networks to third parties. Thus a PAN could provide network access for devices belonging to associates of its owner, or a private network installed in a vehicle could be made available to any passenger traveling in the vehicle.

Typically such private networks may have spare capacity available, but do not offer it to third parties. The reasons for this may include compatibility issues, security or authentication concerns. A major issue which needs to be resolved is the question of how to compensate a private network operator/user for the use of their resources by third parties. Addressing this issue satisfactorily would provide an incentive for private networks to provide such access and thus facilitate the expansion of its provision.

Typically, network operators only grant access to users with whom they have previously signed an agreement. This requires human interaction and potentially negotiation, and thus inevitably results in a substantial delay between the initial access request and provision of a service. For instance, a cellular network provider will have an agreement with a subscriber to whom services are provided, and may have negotiated additional agreements with other entities involved in providing services to the subscriber. This is acceptable in the context of a network whose infrastructure topology does not change rapidly over time. However, this model is not appropriate for providing instant, on-demand access to one of a plurality of heterogeneous networks, where no authorization has previously been obtained.

Providing on-demand access via heterogeneous networks creates its own problems in terms of network management and compensation for entities involved in enabling access to the end user. A particular issue is how to manage a constantly changing network topology and traffic demands. In the context of providing compensation for private network owners, this means that the access network needs to be able to obtain charging and/or topology information associated with a path taken between a user equipment and the access network. For instance, the access network needs to be able to identify which nodes have been involved in relaying a particular communication to or from the access network.

The topology changes in such an arrangement may be similar to those occurring in ad-hoc networks. A wireless or mobile ad-hoc network comprises a series of nodes connected by wireless links. The topology of an ad-hoc network is typically dynamic since nodes are free to move randomly and organize themselves arbitrarily. Such networks may thus be rapidly deployed without relying on a pre-existing network infrastructure, for instance for military communication, as wireless sensor networks, or as temporary networks in the context of a business meeting. WLAN and wireless PAN may be based on an ad-hoc arrangement.

The nodes in an ad-hoc network typically attempt to communicate with each other by relaying packets. However, due to the limited transmission range that is characteristic of nodes in an ad-hoc network, multiple network "hops" are typically needed for one node to exchange data with another node across the network.

In a conventional cellular radio access network, base station locations and cell coverage are typically fixed, at least in the short term. The mobile stations normally communicate directly with a base station, i.e. there is a single hop between the two. However, in multi-hop cellular networks, relay stations may be employed which provide a link between the base station and the mobile station. Communication between the base station and the mobile station can thus be extended by the relay station, which may be fixed or mobile (e.g. other mobile stations subscribing to the cellular network may be used as relay stations). This arrangement can provide additional flexibility in the design, operation and dimensioning of the mobile network.

A common feature between ad-hoc networks, multi-hop cellular networks and other arrangements involving third-party access to local area networks is that they involve the use of relay nodes for forwarding packet data between the access network and a mobile station. Thus in the context described above, one or more nodes or network elements in a private network may act as a relay node for relaying packet data between a third party device and an access network. Typically the relay nodes do not need to interpret the packet data they relay, other than to forward it on to the next node.

In any relay network, it may be advantageous to determine accurate topology information concerning a communication path involving a mobile station and one or more relay nodes. This is particularly so where a private network relays third party data, in order to provide appropriate compensation for the private network. However, known methods for transmitting data in relay networks may suffer from one or more disadvantages in terms of difficulties of obtaining topology information in dynamic arrangements, or inefficient protocol transmission of such information.

There is therefore a need for improved methods for transmitting data between nodes in a communication system. In particular there is a need for an efficient data transmission method suitable for use in relay networks, which facilitates the verification of topology information by an access network. Embodiments of the present invention aim to address one or more of these problems.

SUMMARY OF THE INVENTION

Accordingly, one embodiment of the present invention provides a method for transmitting data in a communication system, comprising receiving first encapsulated data at a first node, generating second encapsulated data associated with the first encapsulated data at the first node and transmitting independently the first encapsulated data and second encapsulated data to one or more further nodes.

In another embodiment, the present invention provides a method for transmitting data in a communication system, comprising receiving encapsulated communication data at a first node; generating control data associated with the encapsulated communication data at the first node; encapsulating the control data at the first node to produce encapsulated control data; and transmitting independently the encapsulated communication data and the encapsulated control data to one or more further nodes.

In another embodiment, the present invention provides a node in a communication system, wherein the node is configured to receive first encapsulated data, generate second encapsulated data associated with the first encapsulated data, and independently transmit the first encapsulated data and the second encapsulated data to one or more further nodes.

In another embodiment, the present invention provides a node in a communication system, comprising data generation means for generating second data associated with first encapsulated data received at the node, encapsulation means for encapsulating the second data to produce second encapsulated data and transmission means for independently transmitting the first encapsulated data and the second encapsulated data to one or more further nodes.

In another embodiment, the present invention provides a computer program product comprising a set of instructions which when executed by a processor in a node in a communication system, causes the node to generate second encapsulated data associated with first encapsulated data received at the node, and independently transmit the first encapsulated data and second encapsulated data to one or more further nodes.

In another embodiment, the present invention provides a communication system comprising a first node and one or more further nodes, wherein the first node is configured to receive first encapsulated data, generate second encapsulated data associated with the first encapsulated data, and independently transmit the first encapsulated data and second encapsulated data to the one or more further nodes.

The first encapsulated data, e.g. the encapsulated communication data, may comprise any type of data, including traffic and/or control data. Preferably the encapsulated communication data comprises traffic data.

In one embodiment the communication network further comprises a second node to which the encapsulated communication data and the encapsulated control data are forwarded by the first node. The second node receives the encapsulated communication data and encapsulated control data from the first node and generates second control data associated with the encapsulated communication data and/or third control data associated with the encapsulated control data. The second node encapsulates the second and/or third control data to produce second and/or third encapsulated control data, and transmits the encapsulated communication data independently from a) the encapsulated control data and b) the second and/or third encapsulated control data to a third node.

The second encapsulated data is preferably control data, in particular control data generated by the first node in connection with forwarding the first encapsulated data. The first node preferably generates control data and then encapsulates it to produce the second encapsulated data. The first encapsulated data may be referred to hereinafter as encapsulated communication data.

The encapsulated communication data may be transmitted to the first node by any network element or node, for instance from a node in a public access network or a private network. In one embodiment encapsulated communication data originates at a mobile node. Thus the encapsulated communication data may be generated, encapsulated and/or transmitted to the first node by the mobile node. The mobile node is preferably equipped for wireless communication with the first node. The mobile node may be, for example, a mobile telephone, PDA, laptop computer or any other type of mobile station.

The control data generated by the first node preferably comprises charging information associated with transmission of the communication data via the first node. The charging information may enable a charging function, for example in an access network, to calculate an appropriate charge to apply to a user of a mobile node for the transmission of the encapsulated data, and/or to credit or compensate the first node for this transmission.

In further embodiments, the second encapsulated data may comprise verification information generated by the first node to confirm that it has received and forwarded the first encapsulated data to a further node. The verification information may comprise an indication of the node from which the first encapsulated data originated, e.g. from a mobile node or another relay node. Likewise, in embodiments discussed below, the third and/or fourth encapsulated data generated by the second node may comprise verifications generated by the second node to confirm that it has received the first and/or second encapsulated data from the first node and forwarded it to a further node. These verifications may, for example, include an indication of the node from which the forwarded data originated, e.g. an indication that the first encapsulated data originated at the first node and that the second encapsulated data originated at the first node.

In preferred embodiments, the encapsulated data, e.g. the first, second, third or fourth encapsulated data, especially the first encapsulated data, may comprise a marker indicating whether it comprises traffic or control data. The first or second node may use this marker in order to determine whether particular types of further control data should be generated in respect of the encapsulated data it receives. For instance, in one embodiment charging information is generated and transmitted by the first or second node only in respect of traffic data (and not in respect of control data) which is forwarded by that node. For example the second node may generate charging information in respect of the first encapsulated data (which in this embodiment comprises traffic data) and transmit this charging information in the third encapsulated data, but the second node generates no charging information in respect of the second encapsulated data, which it also receives from the first node and forwards, because the second encapsulated data comprises only control data generated by the first node in this embodiment.

The encapsulated communication data and encapsulated control data need not necessarily be sent to the same node by the first node. Thus in certain embodiments the encapsulated communication data and encapsulated control data are sent to different nodes. For instance, the encapsulated communication data may be sent from an access network towards a mobile node and relayed by the first node. In this embodiment, the first node may forward the encapsulated control data towards the mobile node, generate encapsulated control data and send the encapsulated control data towards the access network. The access network provides access to services for the mobile node, the encapsulated communication data being generated by or terminating at the mobile node.

In an embodiment of the present invention, data may be sent between nodes (e.g. a mobile node, first or second node, or a node in an access network) using one or more tunnels. Preferably a node (e.g. the first or second node) encapsulates the control data generated by it, i.e. data origins encapsulate data. Thus in one embodiment, each node has its own independent tunnel to the access network reflecting their trust relationships with the access network, by which it sends and receives encapsulated data (e.g. data generated by the endpoint node of the tunnel).

For instance, the communication system may comprise a plurality of tunnels, each tunnel having a first end-node and a second end-node, the second end-node being in the access network, wherein the first end-nodes of each tunnel are different. In one embodiment, the encapsulated communication data is transmitted between the mobile node and the access network by a first tunnel, and the second encapsulated data (e.g. encapsulated control data) is transmitted between the first node and the access network by a second tunnel, the first and second tunnels being independent from one another. Preferably third and/or fourth encapsulated data (i.e. second and/or third control data) is transmitted between a second node and the access network by a third tunnel, the third tunnel being independent from the first and second tunnels. Thus encapsulated communication data and encapsulated control data are transmitted in independent data tunnels.

In preferred embodiments, the encapsulated control data may provide topology information to the access network. This topology information may include information associated with the mobile node and/or the first node, which allows the access network to identify the path taken by the transmitted data. Preferably the second encapsulated control data provides second topology information, associated with the mobile node, the first node and/or second node, to the access network.

The access network may analyse received topology information for topology verification, routing and/or charging purposes. In one embodiment the access network compares the first and second topology information to check that they are consistent. Ambiguities therein may be resolved by means of a verification function.

According to the present invention, encapsulated communication data is relayed by a first node to one or more further nodes. The communication system may comprise a plurality of further nodes which function in a similar manner to the first node to relay the encapsulated communication data, for instance between a mobile node and an access network. Each further node may also operate analogously to the first node, generating its own encapsulated control data and transmitting it towards the access network via its own tunnel. The first and further nodes may be relay nodes comprised in any type of relay network. Thus one or more of the first and further nodes may be comprised, for example, in a local area network, a personal area network, an ad-hoc network or a multi-hop cellular network. Preferably one or more of the first and further nodes is comprised in a first network, which relays data to a destination node comprised in a second network (e.g. an access network). Relay nodes may be fixed (static) or mobile (nomadic). Preferably one or more of the first and further nodes is capable of wireless communication. In certain embodiments, the relay node may be a mobile telephone or laptop computer.

Embodiments of the present invention advantageously facilitate the transmission of data in communication networks, particularly relay networks carrying encapsulated data. By independently transmitting the first and second encapsulated data (e.g. encapsulated communication data and encapsulated control data), additional protocol overhead can be avoided. Furthermore, separation of control data from communication (e.g. traffic) data in independent tunnels may enhance topology discovery and verification by the access network, which is particularly important in networks with a highly dynamic topology. Additionally, the separation of control data from communication data makes it possible to provide for example better than "best effort" Quality of Service for control data, which is typically important to enable and/or maintain capabilities to support communication data transportation. Charging data can also be provided more efficiently to the access network, enabling compensation of relay nodes, particularly where the relay nodes are owned or operated by a different entity to the access network.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The present invention will now be described in more detail and by way of example only, with respect to the following specific embodiments and drawings, in which.

DETAILED DESCRIPTION OF VARIOUS EMBODIMENTS

Figure 1:
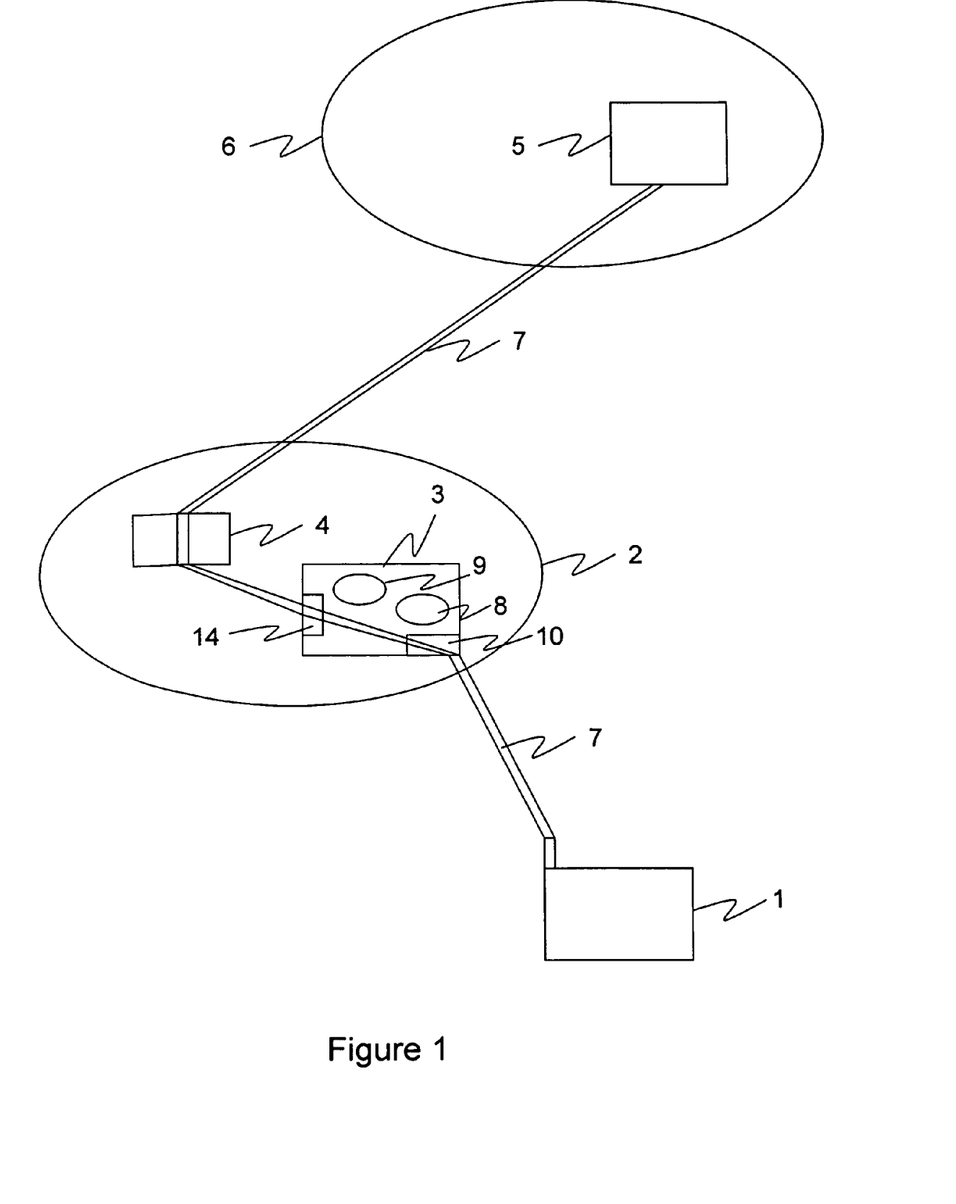
FIG. 1 shows a communications system comprising a relay network in which the present invention may be implemented.

FIG. 1 shows a mobile node 1, such as a mobile telephone or laptop computer, which wishes to access network services. The mobile node is registered to public access network 6, containing a gateway 5. The mobile node is currently located in proximity to a private local network 2 owned by a third party, such as a personal area network. Local network 2 comprises a first relay node 3 and a second relay node 4. Although only 2 relay nodes are shown in FIG. 1, the network may comprise any number of further nodes which relay data in a similar way to those illustrated.

Mobile node 1 can communicate with the first relay node 3 via a wireless link. First node 3, second node 4 and gateway 5 may also communicate via wireless or wired connections.

Some components of the first relay node 3 are shown in FIG. 1. These components may also be present in further nodes, such as the second node. The first relay node 3 comprises a receiver or transceiver means 10 for receiving data from and/or transmitting data to the mobile node 1. The first relay node also comprises a transmission or transceiver means 14 for enabling communication with the second relay node 4. The transceiver means 10 and 14 may comprise, for example, a wireless or wired transmitter device as are known in the art.

The first relay node 3 further comprises a data generation means 8 for generating second data, for instance control data, associated with encapsulated data received from e.g. the mobile node 1. The first relay node 3 also comprises an encapsulation means 9 for encapsulating the second data for transmission to a further node such as the second relay node 4. The data generation means 8 and the encapsulation means 9 may, for example, be implemented by virtue of an appropriated programmed processor in the first relay node.

It may be desirable to provide services to mobile node 1 from access network 6, via local network 2. One way in which to do this is to provide a communication tunnel 7 between the mobile node 1 and the gateway 5 of the access network 6.

Data (e.g. Internet Protocol (IP) packet data) may be trafficked between two nodes in a communication system (e.g. the mobile node and the access network) using a communication tunnel. A tunnel comprises a forwarding path between two nodes for carrying tunnel packets, wherein each tunnel packet encapsulates an original packet. During encapsulation, a header is prepended to the original packet, which specifies the tunnel end-points as source and destination. Security associations (SAs) between the end-points of the tunnel allow data to be securely transmitted through the tunnel over the intervening network elements, such as the local network 2. The entry-point of a tunnel may perform security algorithms on the packet and prepend as part of the tunnel header one or more security headers. The exit-point node decapsulates the packet by performing security algorithms and processing the tunnel security header. The degree of integrity, authentication and confidentiality performed on a tunnel packet at entry and exit points may depend on the type of security header and parameters configured in the SA for the tunnel.

In order to communicate with the gateway 5 via tunnel 7, the mobile node 1 thus encapsulates communication data, e.g. traffic data, and sends it to the first relay node 3. The mobile node is therefore the entry-point of the tunnel. The first relay node 3 forwards the encapsulated data to the second relay node 4, which forwards it on to the gateway 5. The gateway 5 is the tunnel exit-point which decapsulates the tunnel packets. The first and second relay nodes 3 and 4 in the local network 2 are not able to interpret the encapsulated tunnel packets which they relay.

Figure 2:
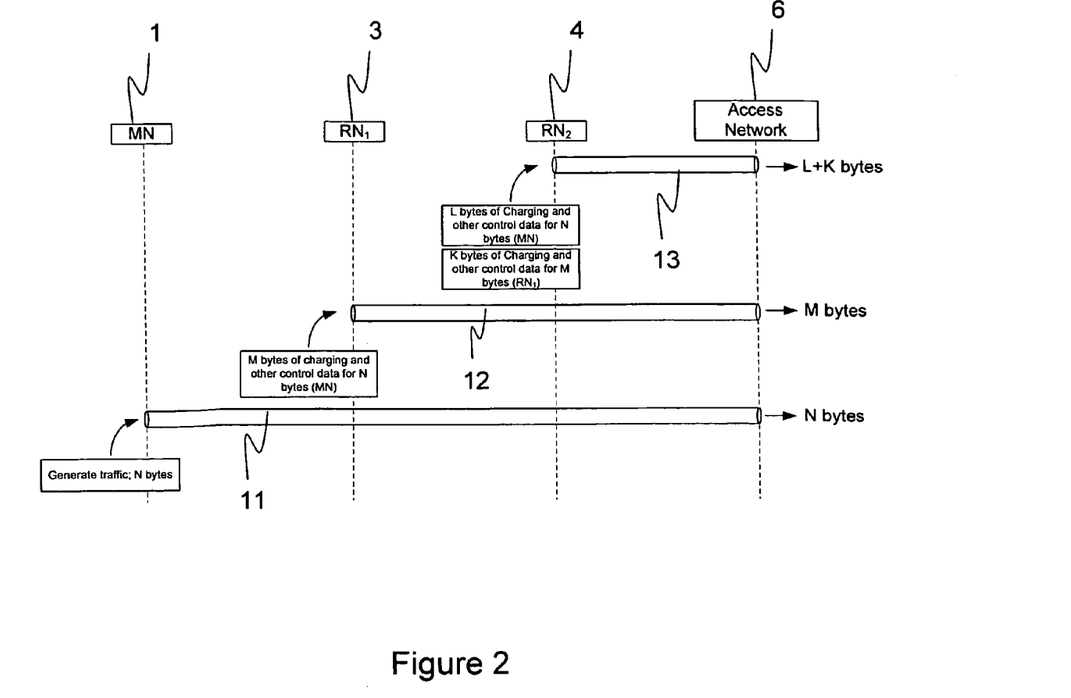
FIG. 2 shows a representation of signaling between nodes in a first embodiment of the present invention.

FIG. 2 shows a simple relay network with two relay nodes 3 and 4 and a single mobile node 1 as discussed in relation to FIG. 1. Each of nodes 1, 3 and 4 has an SA with a node in access network 6 and uses the encrypted tunnels to transfer data. Thus the relay nodes 3 and 4 are not able to interpret the encapsulated and encrypted data which they relay. The establishment of SAs is a known technique and thus will not be discussed further.

In the embodiment shown, the mobile node 1 and relay nodes 3 and 4 each has its own, separate tunnel to access network 6. The tunnels 11, 12 and 13 shown in FIG. 2 are independent from one another. Nodes that create data encapsulate it. Control data generated by relay nodes 3 and 4 is transmitted to the access network using tunnels 12 and 13 respectively, which are independent from tunnel 11. The access network is able to use the control data for verifying network topology information. This method may thus provide user (traffic) and data (control) plane differentiation. In some cases user and control traffic can be transported over different channels.

Figure 3:
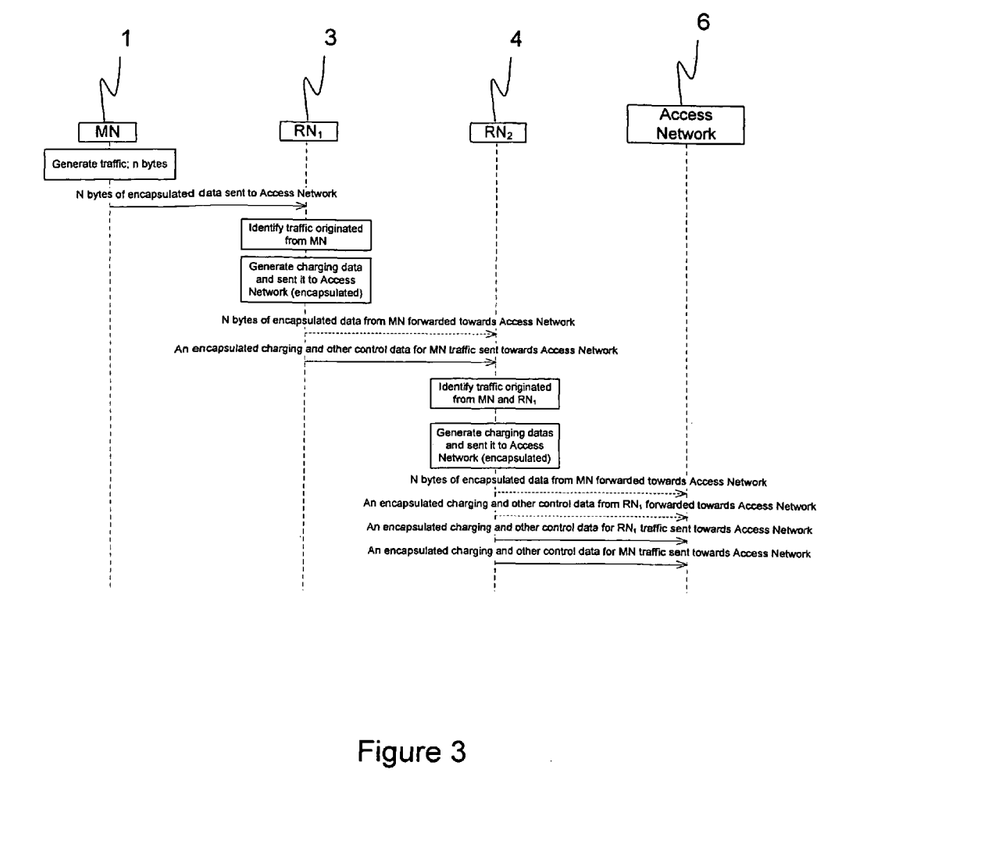
FIG. 3 shows an alternative representation of signaling steps in the first embodiment of the present invention.

As shown in FIG. 2 and additionally in FIG. 3, mobile node 1 sends encapsulated communication data towards access network to first relay node 3. After receiving the encapsulated communication data, first relay node 3 identifies the previous hop (from mobile node 1) and forwards the encapsulated communication data to second relay node 4, for further transmission towards the access network, via tunnel 11. First relay node 3 generates charging and other control data and sends it encapsulated towards access network to relay node 4, via tunnel 12.

Second relay node 4 receives the encapsulated communication data and encapsulated control data and identifies the previous hop (from first relay node 3). Second relay node 4 then forwards all received data (i.e. the encapsulated control data and encapsulated communication data) towards the access network via tunnels 11 and 12. Second relay node 4 generates charging and control data for both received data. Second relay node 4 encapsulates the created (charging and control) data and sends it towards the access network via tunnel 13.

It will be appreciated from the above that the encapsulated communication data and encapsulated control data are not necessarily sent by a relay node 3 or 4 to the same node. For instance traffic going downlink (i.e. from the access network towards the mobile node) should also be reported to the access network. Thus the down link receiver has to be identified and similar control/charging data, as described for the uplink traffic above, has to be encapsulated for transmission towards the access network. For instance, encapsulated traffic data may be sent from the access network to the second relay node 4, for forwarding to the first relay node 3 and on to the mobile node 1. The second relay node 4 generates control data, encapsulates it and sends it towards the access network 6, but forwards the traffic data to first relay node 3. First relay node 3 operates in a similar way for traffic going to the mobile node 1.

From the encapsulated control data received from the relay nodes, the access network can reconstruct the traffic forwarding locations through the relay network. If there are contradicting reports from the relay nodes, the access network can employ a separate topology discovery function to verify traffic routing/switching.

The charging and/or topology information comprised in the control information received by the access network may be used for billing purposes for the mobile node or to ensure that the relay node operator/owner receives appropriate compensation for relaying data. The method can also be used to perform relay switching/routing control of the relays in traffic forwarding. This is beneficial as typically the access network will have an overview of network status and can perform proper traffic handling optimizations. The present method, employing a separate tunnel for each mobile node or relay node, provides secure and flexible control.

Although in the above specific embodiment it is assumed that the relay accounting and topology verification are handled by the access network, in alternative embodiments these functions can be handled at other entities such as access brokers. Furthermore, although in the above embodiment the relay nodes are comprised in a different network to an access network, it will be appreciated that the present invention may be employed whenever it is desired to transmit packet data via a secure tunnel between two nodes in a communication system, using intervening relay nodes. Thus in alternative embodiments, the mobile node may tunnel data to a node in an access network via relay stations which are also comprised in the same access network.

Figure 4:
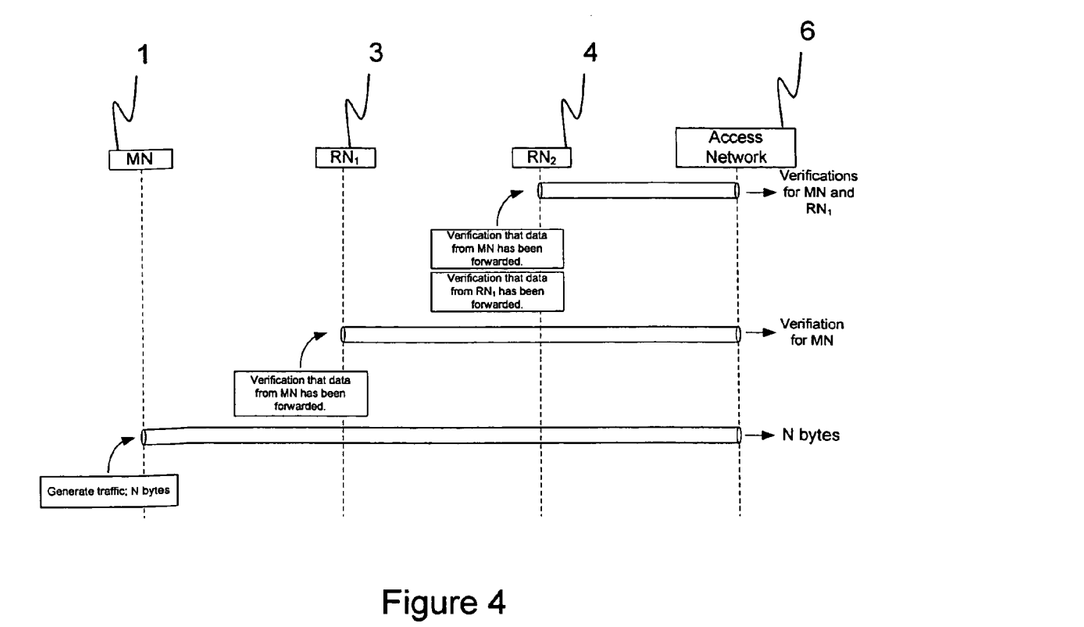
FIG. 4 shows a representation of signaling between nodes in a second embodiment of the present invention.

In a further alternative embodiment, shown in FIG. 4, instead of generating control data such as charging and/or topology information the first and second relay nodes merely report that they have forwarded data originating at another node. The relay nodes also provide an indication of the node from which the data originated. Thus the first relay node 3 sends a verification towards the access network that it has received data from the mobile node and has forwarded this data. Likewise the second relay node 4 sends a verification towards the access network that it has forwarded data originating at the mobile node 1 and a verification that it has forwarded data originating at the first relay node. The node from which the data originated may be indicated by using an identifier in a layer such as the IP layer. Once the access network has received the communication data and related control data, it can then calculate compensations for each relay node involved, since it knows the message sizes.

Thus the present invention provides a method to monitor and to report relay network traffic, for instance in a relay network comprising a mobile node and relay nodes which have security associations with an access network and which use encrypted tunnels for data transfer.

The reporting of relay network traffic contains charging information and additional control information. By using encapsulation for charging and control information the access network can verify its topology information and relay nodes can be compensated accordingly.

Figure 5:
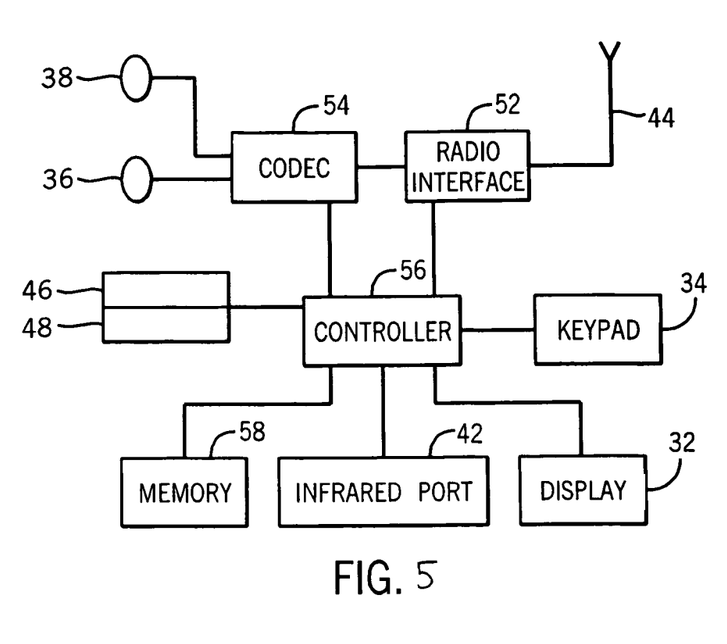
FIG. 5 is a schematic representation of the circuitry that can exist in a device that is involved in the implementation of various embodiments of the present invention.

FIG. 5 shows components which can exist in devices that implement various aspects of the present invention. It should be understood, however, that the present invention is not intended to be limited to one particular type of electronic device. The components included in FIG. 5 include a display 32 in the form of a liquid crystal display, a keypad 34, a microphone 36, an ear-piece 38, an infrared port 42, an antenna 44, a smart card 46 in the form of a UICC according to one embodiment, a card reader 48, radio interface circuitry 52, codec circuitry 54, a controller or processor 56 and a memory unit 58. Individual circuits and elements are all of a type well known in the art, for example in the Nokia range of mobile telephones.

The present invention is described in the general context of method steps, which may be implemented in one embodiment by a program product including computer-executable instructions, such as program code, which can be embodied in computer-readable media and executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for transmitting data in a communication system, comprising:
- receiving first encapsulated data at a first node;
- generating second encapsulated data associated with the first encapsulated data at the first node;
- transmitting independently the first encapsulated data and the second encapsulated data to one or more further nodes, wherein the second encapsulated data comprises charging, topology and verification information and wherein the first encapsulated data comprises user traffic data;
- wherein the first encapsulated data and second encapsulated data are transmitted in separate encrypted data tunnels; and wherein the first encapsulated data and the second encapsulated data are prepended with a header specifying end points of their respective data tunnel;
- wherein the second encapsulated data is sent towards an access network providing access to services for a mobile node, the first encapsulated data being generated by or terminating at the mobile node;
- wherein the first encapsulated data is transmitted between the mobile node and the access network by a first tunnel, and the second encapsulated data is transmitted between the first node and the access network by a second tunnel, the first and second tunnels being independent from one another;
- wherein at least one of third and fourth encapsulated data is transmitted between a second node and the access network by a third tunnel, the third tunnel being independent from the first and second tunnels;
- wherein the second encapsulated data provides first topology information, associated with at least one of the mobile node and the first node, to the access network;
- wherein the third encapsulated data provides second topology information, associated with the mobile node, and at least one of the first node and second node, to the access network; and
- wherein the access network compares the first and the second topology information, and resolves any ambiguities therein via a verification function.

2. The method according to claim 1, wherein:
- the first encapsulated data and the second encapsulated data are forwarded to the second node;
- the second node generates at least one of third encapsulated data associated with the first encapsulated data and fourth encapsulated data associated with the second encapsulated data;
- the second node transmits the first encapsulated data independently from a) the second encapsulated data and b) the at least one of the third and fourth encapsulated data to a third node.

3. The method according to claim 2, wherein the third encapsulated data comprises control data associated with the first encapsulated data and the fourth encapsulated data comprises control data associated with the second encapsulated data.

4. The method according to claim 2, wherein the third encapsulated data comprises second verification information confirming that the first encapsulated data has been forwarded by the second node, and the fourth encapsulated data comprises third verification information confirming that the second encapsulated data has been forwarded by the second node.

5. The method according claim 1, wherein the first encapsulated data is generated, encapsulated and transmitted to the first node by the mobile node.

6. The method according to claim 1, wherein the second encapsulated data comprises charging information associated with transmission of the first encapsulated data via the first node.

7. The method according to claim 1, wherein the first encapsulated data and second encapsulated data are sent to different nodes.

8. The method according to claim 1, wherein at least one of the first node or one or more further nodes are relay nodes comprised in a relay network.

9. The method according to claim 8, wherein at least one of the first node or one or more further nodes are comprised in one of a wireless local area network, a wireless personal area network and a wireless cellular network.

10. The method according to claim 1, wherein the second encapsulated data comprises first verification information confirming that the first node has forwarded the first encapsulated data.

11. The method according to claim 10, wherein the first verification information comprises an indication of the node from which the forwarded data originated.

12. A computer program product tangibly embodied in a non-transitory computer readable storage medium and comprising computer program instructions execution of which by a processor in a node in a communication system, result in operations comprising causing the node to generate second encapsulated data associated with first encapsulated data received at the node, and independently transmit the first encapsulated data and the second encapsulated data to one or more further nodes, wherein the second encapsulated data comprises charging, topology and verification and wherein the first encapsulated data comprises user traffic data; and transmit the first encapsulated data and second encapsulated data in separate encrypted data tunnels; and wherein the first encapsulated data and the second encapsulated data are prepended with a header specifying end points of their respective data tunnel; wherein the second encapsulated data is sent towards an access network providing access to services for a mobile node, the first encapsulated data being generated by or terminating at the mobile node;
- wherein the first encapsulated data is transmitted between the mobile node and the access network by a first tunnel, and the second encapsulated data is transmitted between-the first node and the access network by a second tunnel, the first and second tunnels being independent from one another;
- wherein at least one of third and fourth encapsulated data is transmitted between a second node and the access network by a third tunnel, the third tunnel being independent from the first and second tunnels;
- wherein the second encapsulated data provides first topology information, associated with at least one of the mobile node and the first node, to the access network;
- wherein the third encapsulated data provides second topology information, associated with the mobile node, and at least one of the first node and second node, to the access network; and
- wherein the access network compares the first and the second topology information, and resolves any ambiguities therein via a verification function.

13. A communication system comprising:
a first node; and at least one further node;
- wherein the first node is configured to receive first encapsulated data, generate second encapsulated data associated with the first encapsulated data, and independently transmit the first encapsulated data and the second encapsulated data to the at least one further node, wherein the second encapsulated data comprises charging, topology and verification information and wherein the first encapsulated data comprises user traffic data;

and wherein the first node is configured to transmit the first encapsulated data and second encapsulated data in separate encrypted data tunnels; and wherein the first encapsulated data and the second encapsulated data are prepended with a header specifying end points of their respective data tunnel;

wherein the second encapsulated data is sent towards an access network providing access to services for a mobile node, the first encapsulated data being generated by or terminating at the mobile node;

wherein the first encapsulated data is transmitted between the mobile node and the access network by a first tunnel, and the second encapsulated data is transmitted between-the first node and the access network by a second tunnel, the first and second tunnels being independent from one another;

wherein at least one of third and fourth encapsulated data is transmitted between a second node and the access network by a third tunnel, the third tunnel being independent from the first and second tunnels;

wherein the second encapsulated data provides first topology information, associated with at least one of the mobile node and the first node, to the access network;

wherein the third encapsulated data provides second topology information, associated with the mobile node, and at least one of the first node and second node, to the access network; and wherein the access network compares the first and the second topology information, and resolves any ambiguities therein via a verification function.

* * * * *